UNITED STATES PATENT OFFICE.

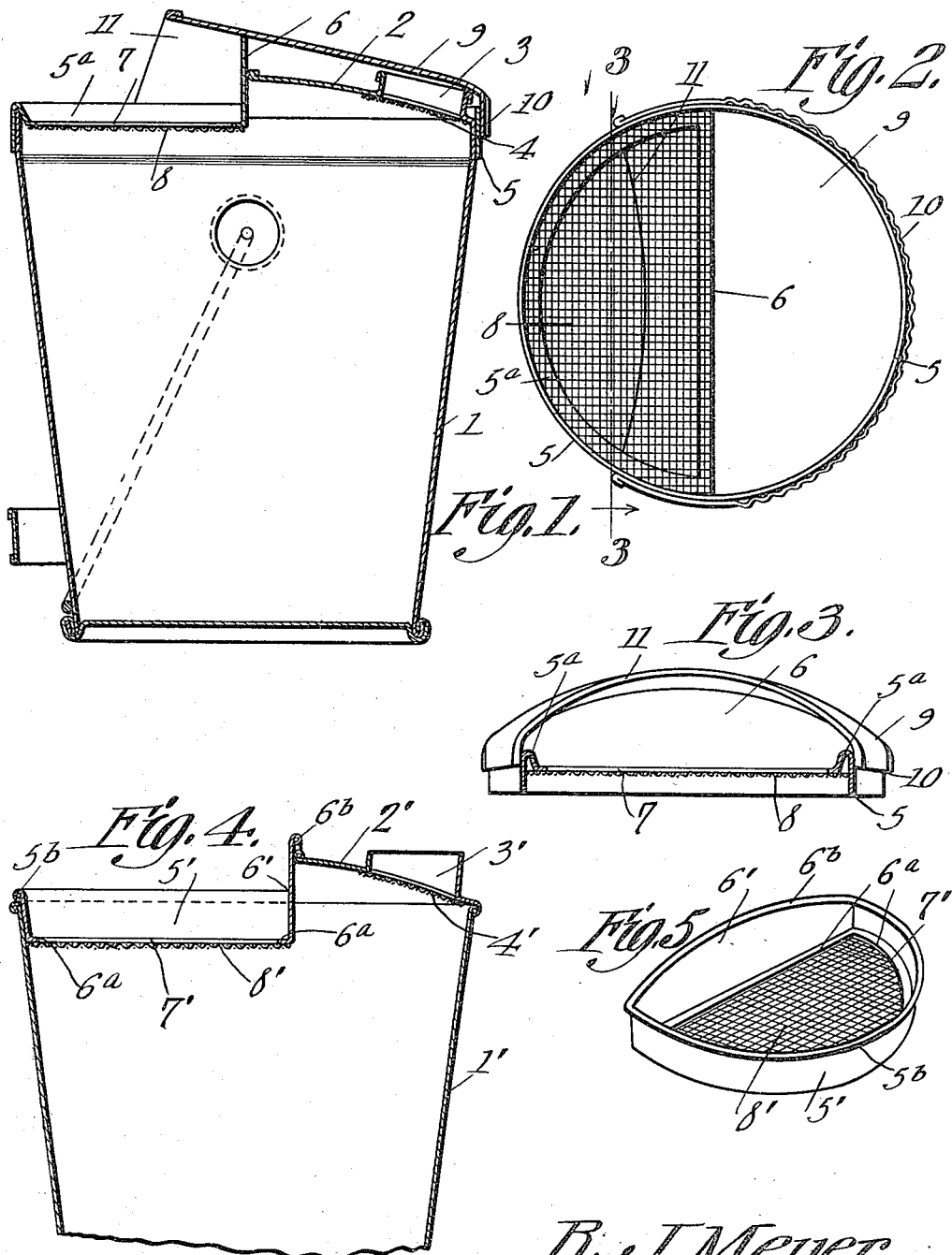

RALPH J. MEYER, OF GRAND JUNCTION, COLORADO.

SANITARY MILK-BUCKET STRAINER.

1,163,940. Specification of Letters Patent. Patented Dec. 14, 1915.

Application filed March 2, 1915. Serial No. 11,599.

*To all whom it may concern:*

Be it known that I, RALPH J. MEYER, a citizen of the United States, residing at Grand Junction, in the county of Mesa and State of Colorado, have invented a new and useful Sanitary Milk-Bucket Strainer, of which the following is a specification.

The present invention appertains to a strainer or cover for milk buckets or pails, and aims to provide a novel and improved strainer applicable to a milk bucket or pail for straining the milk as it enters the bucket and for excluding dust, dirt and other impurities from the bucket to thereby prevent the contamination of the milk contained therein.

Another object of the invention is the provision of a strainer adapted to be inserted within the mouth of a milk bucket between the cowl or crown plate of the bucket and the opposite side thereof, and having a screen for straining the milk as it enters the bucket, and for preventing extraneous matter from entering the bucket while the strainer is in place.

Another object of the invention is to provide a strainer which may be employed upon milk buckets or pails having cowl or crown plates and which may also be employed with equal success upon ordinary buckets or pails which do not have the cowls or crown plates.

A still further object of the invention is to provide a strainer applicable to a milk bucket or pail having a cowl or crown plate, and provided with means for covering the cowl and its spout, to prevent dust, dirt or other foreign matter from lodging upon the cowl or within the spout, while the strainer is in place upon the bucket or pail.

The invention has for another object, to provide a strainer for milk buckets, having means extending over the screen for reducing to a minimum, the liability of dirt, hairs, and other foreign objects dropping upon the screen, and whereby the milk which enters the bucket through the screen will be prevented from contact with dirt or foreign matter in passing through the screen, it being understood that if dirt or other foreign matter falls upon the screen, and should the milk strike the same in passing into the bucket, the milk would be liable to dissolve the foreign matter and carry the same into the bucket.

It is also within the scope of the invention, to provide a strainer of the nature indicated, which is of comparatively simple, substantial non-encumbering and inexpensive construction, and which is convenient, serviceable, practical and efficient in use.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

The invention is illustrated in the accompanying drawing, wherein: Figure 1 is a vertical section taken through a milk bucket and the improved strainer applied thereto. Fig. 2 is a bottom view of the improved strainer. Fig. 3 is a sectional view taken on the line 3—3 of Fig. 2. Fig. 4 is a view similar to Fig. 1, illustrating a modified form of strainer, a portion of the bucket being broken away. Fig. 5 is a perspective view of the modified form.

Referring specifically to Figs. 1, 2 and 3, wherein the preferred embodiment of the invention is illustrated, there is delineated an ordinary milking bucket or pail 1, having the curved cowl or crown plate 2 at its upper end overhanging its mouth, or providing a restricted segmental-shaped mouth for the bucket. The cowl 2 is provided with a pouring spout 3 having a straining screen 4 extending across the same, for straining the milk as it is poured from the bucket when the bucket is tilted properly. The strainer constituting the present invention embodies an annular rim or band 5 adapted to be slipped over the upper end or mouth portion of the bucket 1. The upper edge of the rim or band 5 is provided with a reentrant downturned flange or lip 5$^a$ extending through an arc of approximately 180 degrees and adapted to fit over and within the upper edge of the bucket 1 opposite the cowl 2, so that the ends of the flange or lip 5$^a$ extend to and abut against the edge of the cowl 2. The flange or lip 5$^a$ is inclined so as to slip conveniently and effectively within the mouth and bear against the inner side of the bucket when the rim 5 is placed on the bucket. An upstanding plate or wall 6 extends between and is terminally attached to the ends of the flange 5ᵃ, the plate 6 being disposed approximately diametrically with respect to the bucket and projecting upwardly above the flange 5ᵃ; so as to bear against and project above the edge of the cowl 2 upon the outside thereof. The plate 6 extends upwardly for a considerable distance, in order that it will bear against the edge of various cowls having different curvatures. The flange 5ᵃ and plate 6 combine to form a D-shaped member which is adapted to be slipped downwardly into the mouth of the bucket between the cowl 2 and opposite side of the bucket, the inclined flange 5ᵃ being adapted to fit snugly against the upper edge portion of the bucket, and to assist in moving the plate 6 against the edge of the cowl 2. The flange 5ᵃ and plate 6 have a segmental-shaped opening 17 therebetween and a straining screen 8 of fine mesh is secured to the bottom of the lower inturned edge portions of the flange 5ᵃ and plate 6 to prevent the passage of dust, dirt and other impurities downwardly through the opening 7 of the D-shaped member 5ᵃ—6, but to enable the milk to pass readily downward into the bucket during the milking operation. The present strainer or straining cover of the bucket also includes a cowl-shaped hood 9 which is soldered or otherwise secured upon the rim 5 and plate 6 opposite to the flange 5ᵃ, to cover that space between the plate 6 and that side of the rim 5 remote from the screen 8. The hood 9 may overlap the rim 5, as at 10, if desired, for the purpose of soldering or otherwise securing the hood to the rim, and that edge portion of the hood 9 which is secured to the rim may be downturned and corrugated as illustrated, if desired. The hood 9 projects beyond the plate 6, as at 11, over the screen 8, to provide a means for protecting the screen, since the extended or overhanging portion 11 of the hood will prevent, to a large extent, the falling of dirt, hairs and other extraneous matter onto the screen 8. There is a sufficient opening between the portion 11 of the hood and the flange 5ᵃ to enable the milk to enter the bucket at the proper angle.

All parts of the strainer, with the exception of the screen 8, may be readily constructed from sheet metal, which may be galvanized or otherwise finished for the purpose of wear and appearance, and the construction will be substantial and desirable.

The strainer may be readily applied upon the bucket, as illustrated in Fig. 1, whereby the hood 9 will cover the cowl 2 and spout 3, to prevent dirt and foreign matter from lodging upon the cowl or within the spout 3, and as a result, when the strainer is removed to enable the milk to be poured from the bucket, the milk may flow from the spout 3 without the danger of foreign matter within the spout being carried therefrom with the milk.

It will be evident from the foregoing that the present strainer will strain the milk as it enters the bucket, and will exclude dirt and other impurities from the bucket, and it is also evident that the strainer may be readily removed from the bucket for the purpose of cleaning the same or enabling the milk to be poured from the bucket through the spout 3. The construction of the device is such that it may be easily and thoroughly cleaned, and the strainer may remain upon the bucket at all times, except when it is desired to clean the bucket or strainer, or to pour the milk from the bucket. Attention is also directed to the fact that the strainer may be applied to an ordinary bucket, not possessing the cowl and pouring spout, since the rim 5 will readily slip over an ordinary bucket or pail and the hood 9 will close the opening which is closed by the cowl as illustrated in Fig. 1.

In the modified form illustrated in Figs. 4 and 5, the strainer is simplified and is adapted especially for use upon a milk bucket having a cowl. The milk bucket or pail 1′ has the cowl 2′ provided with the spout 3′ and straining screen 4′, the same as with the bucket or pail illustrated in Fig. 1, and the strainer comprises a D-shaped member, similar to the D-shaped member 5ᵃ—6 of the preferred form, and embodying an arcuate strip 5′ having its walls inclined and an upstanding plate 6′ between the ends of the strip 5′. The strip 5′ is adapted to fit within the bucket opposite the cowl 2′ and the plate 6′ is adapted to bear against the edge of the cowl, the same as in the first form of the invention. The upper edges of the strip 5′ and plate 6′ are provided with outturned beads 5ᵇ and 6ᵇ, respectively, for strengthening the structure and to assist in limiting the downward movement of the strainer into the mouth of the bucket. The lower edges of the strip 5′ and plate 6′ are inturned, as at 6ᵃ, there being an opening 7′ between the strip 5′ and plate 6′, and a straining screen 8′ being soldered or otherwise secured to the bottom of the inturned edge portions 6ᵃ of the D-shaped member 5′—6′.

It is evident that the modified form of strainer may be readily applied within the mouth of the bucket between the cowl 2′ and the opposite wall of the bucket, and serves to strain the milk and exclude the foreign matter from the bucket. With the modified form, however, the cowl 2′ and spout 3′ and its screen 4′ are unprotected, and in this particular, the first form of the invention is desirable over the second form, since with the first form of the invention, the cowl and parts carried thereby are thoroughly protected from dust, and the like.

From the foregoing, taken in connection with the drawing, the advantages and attributes of the two forms of the invention will be obvious to those versed in the art, it being noted that the two forms of the invention have common and independent advantages, due to the common and specific details of the construction.

Having thus described the invention, what is claimed as new is:—

1. The combination with a milk bucket having a cowl provided with a pouring spout, of a strainer embodying a D-shaped member fitting within the mouth of the bucket, said member having an arcuate portion fitting within the pail opposite the cowl, and having an upstanding plate between the ends of said arcuate portion to rest against and project above the edge of the cowl upon the outside thereof, and a screen secured to the lower edges of said arcuate portion and plate, the walls of said arcuate portion being inclined and bearing against the inner side of the bucket, whereby when said member is pressed down, the plate will be forced against the edge of the cowl to provide a tight fit of the D-shaped member in the mouth of the bucket.

2. The combination with a milk bucket having a cowl provided with a pouring spout, of a strainer embodying a rim slipped over the upper end of the bucket, the upper edge of the rim having an arcuate reëntrant flange fitting within the bucket opposite the cowl, an upstanding plate between the ends of said flange to rest against and project above the edge of the cowl, a screen secured to the lower edges of said flange and plate, and a cowl-shaped hood upon the upper edge of said plate and that portion of the rim opposite the flange, the hood covering the cowl, and projecting beyond said plate to overhang the screen.

In testimony that I claim the foregoing as my own, I have hereto affixed my signature in the presence of two witnesses.

RALPH J. MEYER.

Witnesses:
WM. CAMPBELL,
OSCAR L. FAIRLEY.

Copies of this patent may be obtained for five cents each, by addressing the "Commissioner of Patents, Washington, D. C."